United States Patent [19]

Koch

[11] 3,774,170

[45] Nov. 20, 1973

[54] FIXED DATA MEMORY UTILIZING SCHOTTKY DIODES

[75] Inventor: Sigurd Koch, Munich, Germany

[73] Assignee: Siemens Aktiengesellschaft, Berlin and Munich, Germany

[22] Filed: Apr. 28, 1971

[21] Appl. No.: 138,186

[30] Foreign Application Priority Data

May 11, 1970 Germany.................. P 20 22 918.9

[52] U.S. Cl.......................... 340/173 SP, 317/234 N

[51] Int. Cl......................... G11c 17/00, G11c 11/36

[58] Field of Search.............................. 340/173 SP; 317/235 UA, 234 N

[56] References Cited

UNITED STATES PATENTS

| | | | |
|---|---|---|---|
| 3,245,051 | 4/1966 | Robb | 340/173 SP |
| 3,611,067 | 10/1971 | Oberlin | 317/235 UA |
| 3,377,513 | 4/1968 | Ashby | 340/173 SP |
| 3,384,879 | 5/1968 | Stahl | 340/173 SP |
| 3,641,516 | 2/1972 | Castrucci et al. | 340/173 SP |
| 3,541,543 | 11/1970 | Crawford | 340/324 R |
| 3,691,627 | 9/1972 | Engeler | 317/234 N |

OTHER PUBLICATIONS

Fischler, Read Only Store, 1/71, IBM Technical Disclosure Bulletin, Vol. 13, No. 8, pp. 2172–2173.

Anantha, Fabricating Schottky Barrier Photodiodes and Diode Arrays, IBM Technical Disclosure Bulletin, Vol. 12, No. 1, 6/69, pp. 11–12.

Abbas, Electronically Encodable Read-Only Store, 11/70, IBM Technical Disclosure Bulletin, Vol. 13 No. 6, pp. 1426–1427.

DeWitt, Memory Array, IBM Technical Disclosure Bulletin, Vol. 10, No. 1, 6/67, p. 95.

*Primary Examiner*—Vincent P. Canney
*Assistant Examiner*—Stuart Hecker
*Attorney*—Curt M. Avery, Arthur E. Wilfond, Herbert L. Lerner and Daniel J. Tick

[57] ABSTRACT

A fixed data memory utilizes Schottky diodes. The cathodes of the diodes are guided together, for one row or column, over a buried layer.

4 Claims, 4 Drawing Figures

FIXED DATA MEMORY UTILIZING SCHOTTKY DIODES

DESCRIPTION OF THE INVENTION

The invention relates to an integrated fixed data memory comprising a plurality of memory elements. More particularly, the invention relates to a fixed data memory utilizing Schottky diodes.

Known memory elements consist of normal bipolar semi-conductor diodes each having a pn junction. A single memory element may comprise two series opposed diodes.

The individual memory elements are arranged in the form of a matrix. In an integrated fixed data memory, all electrical conductors or connections should be situated in rows and columns, on one side of the entire arrangement. As a result, in order to avoid short-circuits, the wiring of rows and columns must extend in two separate planes. An electrically insulating layer is required to separate the planes. As a consequence, the customary contact windows must be opened in the insulating layer. Altogether, this known method for wiring memory elements requires many method steps.

The object of the invention is to provide an integrated fixed data memory having a diode matrix whose memory elements have the simplest possible wiring and a minimal space requirement.

To this end, and in accordance with the invention, each memory element consists of a diode, particularly a Schottky diode, and highly-doped channels are provided in the semiconductor zone, serving as an electrically conductive lead of a semiconductor zone of the diodes.

The Schottky effect is an increase in anode current of a thermionic tube beyond that predicted by the Richardson equation, due to lowering of the work function of the cathode when an electric field is produced at the surface of the cathode by the anode. The Schottky effect is described on pages 68 and 69 of the McGraw-Hill Encyclopedia of Science and Technology Volume 12, 1960, McGraw-Hill Book Company, Inc. and on page 8–77 of the Handbook of Physics, Edited by E.U. Condon and H. Odishaw, 1958, McGraw-Hill Book Company, Inc. The Schottky exhaustion layer theory is described on page 8–61 of the aforedescribed Handbook of Physics.

The invention provides a very simple wiring of the individual memory elements. Some contacts or conductors of the diodes of the matrix may be guided in one direction; the channels which represent the other contacts or conductors of the diodes may be guided, for example, in a direction perpendicular thereto.

It is particularly favorable to wire Schottky diodes to form a memory matrix, with the aid of the indicated arrangement. Schottky diodes require only a unipolar semiconductor body wherein channels are simultaneously provided for charge carriers of the same polarity or sign, said channels being more intensely doped, however.

According to another feature of the invention, buried layers are provided as highly-doped channels. Buried layers are simple to produce by the known diffusion methods. They do not entail expensive or intricate technology.

Finally, insulating walls are provided between the columns or the rows of the memory elements, which insulate the cathodes of a column or a row, from each other. The insulating walls run parallel to the buried layer.

In order that the invention may be readily carried into effect, it will now be described with reference to the accompanying drawing, wherein.

Figure 1:
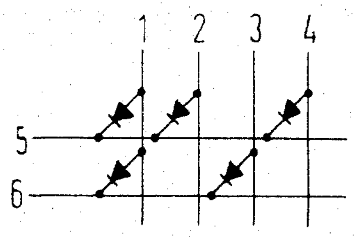
FIG. 1 is a schematic diagram of a fixed data memory having diodes.

In FIG. 1, various columns 1, 2, 3 and 4 and various rows 5 and 6 of a memory matrix are shown. The programming of the matrix lies in the fact that diodes are provided only between the columns 1, 2 and 4 and the row 5, and between the columns 1 and 3 and the row 6. There are no diodes between the column 3 and the row 5 and between the columns 2 and 4 and the row 6.

Figure 2:
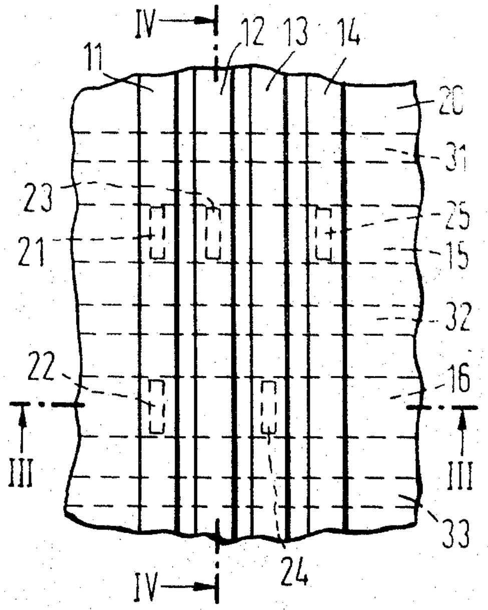
FIG. 2 is a top view of a fixed data memory which reveals the circuit of FIG. 1.
Figure 3:
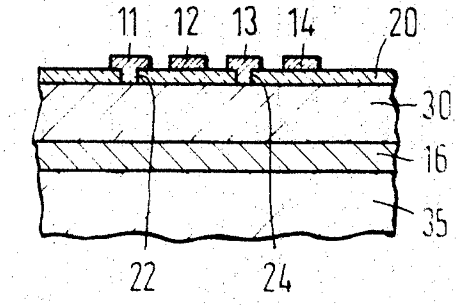
FIG. 3 is a sectional view taken along the lines III—III of the memory of FIG. 2.
Figure 4:
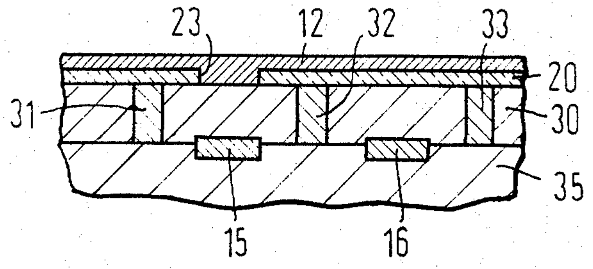
FIG. 4 is a sectional view taken along the lines IV—IV of the memory of FIG. 2.

In FIG. 2, conductor paths or electrical conductors 11, 12, 13 and 14 are provided which correspond to the columns 1, 2, 3 and 4 of FIG. 1. The conductor path 11 is in contact, via contact holes, apertures, bores, windows, or the like, 21 and 22, shown in broken lines in FIG. 2, with an epitactic semiconductor layer 30 (FIG. 3) of n conductivity type. Two Schottky diodes are positioned or located in the contact holes 21 and 22. A Schottky diode is also positioned in a contact hole, aperture, bore, window, or the like, 23, between the conductor 12 and the semiconductor layer 30 (FIG. 4). A Schottky diode is positioned in a contact hole, aperture, bore, window, or the like, 24, between the conductor 13 and the semiconductor layer 30 (FIG. 3). A Schottky diode is positioned in a contact hole, aperture, bore, window, or the like, 25, between the conductor 14 and the semi-conductor layer 30.

As shown in FIGS. 3 and 4, highly doped buried layers 15 and 16 of *n* conductivity type having a layer resistance of 20 to 25 ohms, extend beneath the semiconductor layer 30. The layers 15 and 16 correspond to the rows 5 and 6 of FIG. 1. Insulating walls 31, 32 and 33 (FIG. 4) extend parallel to the buried layers 15 and 16. The insulating walls 31, 32 and 33 are *p*-doped and are of *p* conductivity type and divide the semiconductor layer 30, into individual strips which are electrically insulated from one another. The insulating walls 31, 32 and 33 extend from the insulating layer 20 to a semiconductor substrate 35 of *n* conductivity type which is provided below the semiconductor layer 30. In FIG. 1, the insulating walls 31, 32 and 33 and the buried layers 15 and 16 are shown in broken lines.

The programming of the fixed data memory is effected via the insulating layer 20. The desired contact holes are etched in the insulating layer 20 with the aid of the photo method. A memory element requires a rectangular area having lateral dimensions of approximately 60 by 20 micrometers. Thus, approximately 800 memory elements may be accommodated in an area of one square millimeter. This high density is made possible by the fact that all the cathodes of the diodes required for the memory elements are formed together, for one row, by one buried layer. Other advantages offered thereby are the embedded wiring, since the conductors which are the columns of the diode matrix do not cross. Lastly, the use of Schottky diodes permits a further reduction of method steps required for the production of the fixed data memory.

Schottky diodes are described in Electronics Magazine of July 21, 1969, pages 74 to 80.

While the invention has been described by means of a specific example, and in a specific embodiment, I do not wish to be limited thereto, for obvious modifications will occur to those skilled in the art without departing from the spirit and scope of the invention.

I claim:

1. An integrated fixed data memory, comprising a semiconductor body having a zone having highly doped channels provided therein; and a plurality of memory elements each consisting of a Schottky diode, each of the diodes having a semiconductor region and an electrically conductive lead comprising one of said channels in said zone of said semiconductor body.

2. A data memory as claimed in claim 1, wherein said channels in said zone of the semiconductor body comprise buried layers.

3. A data memory as claimed in claim 1, wherein said memory elements are arranged in columns and rows, and further comprising insulating walls in the semiconductor body between the rows of the memory elements.

4. A data memory as claimed in claim 3, wherein said channels in said zone of the semiconductor body comprise buried layers extending substantially parallel to said insulating walls.

* * * * *